(12) United States Patent
Engelhardt

(10) Patent No.: US 6,576,901 B1
(45) Date of Patent: Jun. 10, 2003

(54) ARRANGEMENT FOR SCANNING A SPECIMEN RECEIVING DEVICE

(75) Inventor: Johann Engelhardt, Bad Schoenborn (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 378 days.

(21) Appl. No.: 09/713,071

(22) Filed: Nov. 15, 2000

(30) Foreign Application Priority Data

Nov. 24, 1999 (DE) .......................... 199 56 438

(51) Int. Cl.⁷ .......................... G02B 21/26; G02F 1/29; G02N 23/00
(52) U.S. Cl. .................. 250/309; 250/234; 359/391; 359/398; 359/309
(58) Field of Search .................. 250/234; 359/391, 359/398, 309

(56) References Cited

U.S. PATENT DOCUMENTS 4,029,949 A * 6/1977 Dew .......................... 700/60
6,252,236 B1 * 6/2001 Trulson et al. .......... 250/458.1

\* cited by examiner

*Primary Examiner*—John R. Lee
*Assistant Examiner*—Kalimah Fernandez
(74) *Attorney, Agent, or Firm*—Simpson & Simpson, PLLC (57) ABSTRACT

The invention concerns an arrangement for scanning a specimen receiving device (1) for data recording with a laser scanning microscope, preferably with a confocal laser scanning microscope (2), with which imaging of large specimen fields with sufficient speed is possible by scanning of the specimen receiving device (1), which is characterized in that the specimen receiving device (1) is alternatingly rotatable about a first axis (4) by a rotation device (3).

27 Claims, 6 Drawing Sheets

ARRANGEMENT FOR SCANNING A SPECIMEN RECEIVING DEVICE

CROSS REFERENCE TO RELATED APPLICATIONS

This invention claims priority of a German patent application DE-199 56 438.8 which is incorporated by reference herein.

FIELD OF THE INVENTION

The present invention concerns an arrangement for scanning a specimen receiving device for data recording with a laser scanning microscope, preferably with a confocal laser scanning microscope.

BACKGROUND OF THE INVENTION

In laser scanning microscopes, exciting light from a laser is focused onto a specimen and the intensity of the detected light from that focus position is detected with a detector. In order to obtain a two- or three-dimensional image of the specimen, either the focused laser beam is scanned over the specimen (beam scanning) or the specimen is moved through the focus position (specimen scanning). Beam scanning is usually implemented with a scanning mirror arranged movably in the beam path of a laser scanning microscope; this allows relatively rapid data recording. For certain applications, however, the maximum specimen field that can be recorded—which is defined by the microscope optical system used—is too small. No limitation in terms of specimen field exists with specimen scanning, in which a specimen holder is moved in a meander pattern through the focus position; this is generally implemented with mechanically complex X-Y displaceable stages. Large masses must be accelerated in this context, however, with the result that data recording is time-intensive and is associated with a high outlay in terms of control technology. Data recording is considerably slower with specimen scanning, and this is unacceptable for routine applications.

SUMMARY OF THE INVENTION

It is therefore the object of the present invention to provide an arrangement, with which imaging and scanning of large specimen fields can be performed at sufficient speed; this is also, in particular, to be possible with the use of simple microscope optics.

The aforesaid object is achieved by an arrangement for scanning a specimen comprising:
   a specimen receiving device for data recording
   a laser scanning microscope,
   a rotation device, defining a first axis, for alternatingly rotating the specimen receiving device about the first axis and
   a second axis is defined in the rotation device for rotating the specimen receiving device about the second axis.

According to the present invention, what has been recognized first of all is that imaging of large specimen fields can be achieved with specimen scanning, in particular using simple microscope optics, if the imaging speed hitherto attainable can be increased. According to the present invention, for this purpose the specimen receiving device is not moved in a linear direction through the focus, but rather is alternatingly rotated about a first axis by a rotation device.

The term "alternatingly rotatable" is to be understood in this connection to mean that the specimen receiving device is first rotated clockwise about a rotation axis, and then counter-clockwise about the same rotation axis. In other words, the resulting rotary movement is made up of recurring individual rotations in opposite directions. The rotation of the specimen receiving device is effected by a suitable rotation device. With a rotation of this kind, a recurring data recording of a corresponding "one-dimensional" circular segment of the specimen is detected.

A data recording going beyond one circular segment is made possible, in an advantageous embodiment, by the fact that the specimen receiving device is rotated, together with the rotation device, about a second axis. This makes possible two- or three-dimensional data recording from the specimen. In physical terms, the specimen receiving device could be attached, together with the rotation device of the first axis, to a retainer that is mounted rotatably about the second axis. If the first rotation axis is arranged at least almost parallel to the second rotation axis, it is thereby possible to achieve a scanning motion of the specimen that lies in one plane.

Advantageously, the two rotation axes are arranged relative to the optical axis of the laser scanning microscope in such a way that the resulting scan trajectories of the two axes extend almost orthogonally to one another. The term "scan trajectory" is to be understood in this context as the line pattern, projected by the laser scanning microscope onto the specimen, that results from the scanning motion of the specimen receiving device. It represents the coordinate system of the image data after digitization. If the two rotation axes are arranged such that their scan trajectories each extend almost orthogonally to one another, the result is optical scanning of the specimen at a scanning rate (and a resolution and therefore information density) that is almost spatially uniform. This is important above all in terms of subsequent processing of the recorded image data, since the latter are present, after a data recording, in the curvilinear coordinate system and, for example after a coordinate transformation into a rectilinear coordinate system, also possess a largely uniform information density.

Advantageously, it is possible to move the specimen receiving device, together with the rotation device, in translational fashion so as thereby to produce a two- or three-dimensional data recording or scan of a specimen.

In a concrete embodiment, the resulting scanning motion of the specimen receiving device lies in one plane. Two-dimensional regions of three-dimensional specimens can thus be imaged or scanned.

In a further embodiment, the scanning motion of the specimen receiving device extends at least almost parallel to the surface of the specimen receiving device. If the specimen to be detected is located directly beneath the surface of the specimen receiving device, by way of this feature it is possible for the specimen to be completely imaged by scanning a single plane, provided the specimen thickness and the depth of the field of the microscope optics are of the same order of magnitude.

If the specimen receiving device is moved translationally together with the rotation device, in an alternative embodiment provision is made for the translational movement to extend at least almost parallel to the surface of the specimen receiving device. This can again produce a scanning motion which then lies in one plane and extends parallel to the surface of the specimen receiving device. This, too, would advantageously make possible a complete data recording of a specimen located directly beneath the surface of the specimen receiving device.

If it is necessary to image three-dimensional specimens whose extension along the optical axis is greater than the depth of field of the microscope optics, provision is made for a translational motion of the specimen receiving device along the optical axis. It is thus ultimately possible, by way of the combination of rotational and translational motions, to use specimen scanning to record a complete image of a three-dimensionally extending specimen.

In a concrete embodiment, the translational motion extends along one linear direction. In particular, the translational motion could extend perpendicular to the first rotation axis. Concretely, the translational motion extends periodically in opposite directions, i.e. what is present is a recurring back-and-forth movement of the specimen receiving device together with the rotation device. This could be implemented, for example, by way of a linear displacement stage having corresponding guidance means.

In particularly advantageous fashion, the specimen receiving device is arranged with respect to the optical axis of the laser scanning microscope in such a way that the line normal to the surface of the specimen receiving device forms an angle with the optical axis of the laser scanning microscope that differs from 0 degrees. The principal return reflection of the exciting light, which occurs for example at the optical transition to the specimen receiving device, can thus advantageously be suppressed or blocked out from the excitation or detection beam path of the laser scanning microscope. This is important in particular because a (bandpass) blocking filter of lesser strength can now be used, which only insignificantly reduces the fluorescent light being detected. Blocking out the principal return reflection is advantageous in particular when lasers are used, since the exciting light returning to the laser generally disrupts its stimulated emission, which can result in undesirable intensity fluctuations in the laser light. In addition, it is possible to prevent reflections from specimen holder edges that can result in disruptive interference in the specimen region and thus also cause imaging artifacts.

The reflected component of the exciting light that is blocked out in this fashion therefore does not arrive at the detector, thus making possible an increase in the dynamic range of the detected signal. Corresponding blocking filters that are arranged in front of the detector in order to filter scattered or reflected components of the exciting light out of the detection beam path can thus advantageously be selected in such a way that the detected light is attenuated less by these filters placed in front of the detector. Advantageously, the angle between the line normal to the surface of the specimen receiving device and the optical axis of the laser scanning microscope is greater than 0 and less than 10 degrees.

The specimen receiving device has a specimen holder and a specimen holder unit. The specimen holder receives the specimen being detected and can be, for example, a conventional specimen holder made of glass. The specimen on the glass specimen holder could be covered with a cover slip. In very general terms, the specimen holder can have a glass plate on which the specimens to be imaged are arranged or wax-mounted. This glass plate is then integrated into a corresponding chamber unit.

The specimen receiving device could be automatically loaded with specimen holders, thus making possible, in automated laboratory use, a high throughput of specimen holders for examination.

The specimen holder unit and the specimen holder are produced from material with a low density/weight, preferably from plastic or aluminum. Lightweight design for these constituents allows a high scanning frequency for the rotation device, so that the data recording time can advantageously be reduced.

The specimen receiving device that is to be scanned is configured such that its center of gravity lies on the first or second rotation axis. With a physical configuration of this kind, no additional torques occur during scanning, the principal result thereof being that minimization of the vibrations of the specimen receiving device brought about by the scanning operation can be achieved.

In terms of automatic loading of the specimen receiving device with specimen holders, the specimen holder could be attached to the specimen holder unit with at least one clamping apparatus. A conventional metal clamping spring which presses the specimen holder onto a support of the specimen holder unit could be used, for example, as the clamping apparatus.

The specimen holder could also be attached to the specimen holder unit with the aid of a negative-pressure or vacuum device. The negative-pressure or vacuum device could, for example, be arranged in stationary fashion on the laser scanning microscope and connected via a flexible hose to the specimen holder unit in order to act upon the specimen holder with negative pressure.

It would furthermore be conceivable for the specimen holder to be attachable to the specimen holder unit on the basis of magnetic or electromagnetic interaction. For that purpose, for example, a portion of the specimen holder could be made of ferromagnetic material that can be attached to a metallic or also ferromagnetic specimen holder unit. It is also conceivable for the specimen holder unit to be configured electromagnetically so that a specimen holder made at least partially of metal can be attached by electromagnetic interaction to the specimen holder unit.

Advantageously, a galvanometer is used as the rotation device of the specimen receiving device. This is advantageous in particular because galvanometers, as compared to linear displacement stages, are economically, easy to control, and commercially available in a wide variety of specifications. The galvanometer that rotates the specimen receiving device can accordingly be selected and dimensioned so that the highest possible oscillation frequency is achievable with minimum vibration phenomena in the specimen scanning system. In this context, any deviation from the reference or actual position of the galvanometer, or deviation in scanning speed, should be minimal. The galvanometer is operated at a frequency in the range from 10 to 1000 Hz. If the rotation device is to be operated at a constant scanning frequency, a resonant galvanometer could be used. This would offer the advantage that the oscillation produced by the resonant galvanometer corresponds practically exactly to the reference frequency of the resonant galvanometer.

A galvanometer could also be provided as the further rotation device for the second axis. This galvanometer is dimensioned in such a way that it rotates the specimen receiving device together with the rotation device of the first axis. This galvanometer is accordingly operated at a lower scanning frequency. Ideally, the physical arrangement of the assemblies to be rotated by this further galvanometer is selected in such a way that, in order to avoid additional torques, their center of gravity is located on the axis of the further galvanometer.

In a further embodiment, a lever device is provided as the rotation device for the second axis. The lever device has an electric motor, a threaded spindle, a recirculating threaded piece, and a connecting element. The threaded spindle is associated with the shaft of the electric motor, and a circulating threaded coupling located on the threaded spindle can be positioned, by rotation of the threaded spindle, along the direction of the axis of the threaded spindle; no inherent rotation is provided for the circulating threaded coupling. The circulating threaded coupling is connected to the rotation device via a connecting element; the connecting element could, for example, be embodied as a leaf spring. Advantageously, torque transfer of the linear motions of the circulating threaded coupling to the rotation device by way of the leaf spring is accomplished with zero play, with the result that a well-defined and, above all, reproducible rotary motion can be performed.

If the electric motor is arranged in stationary fashion, rotation of the shaft and of the threaded spindle moves the circulating threaded coupling in the direction of the axis of the threaded spindle; as a result, with reference to the second rotation axis of the specimen receiving device, a torque is transferred to the specimen receiving device, so that the latter is thereby rotated about the second axis. Advantageously, the electric motor is attached in such a way that it is mounted in resiliently pivotable fashion about an axis. This axis could be arranged perpendicular to the rotation axis of the electric motor. Any slight imbalance in the shaft of the electric motor or any slight mechanical disruption of the specimen scanning system can be compensated for by the resilient mounting of the electric motor, so that these disruptions are not transferred to the rotation device, for example in the form of undesirable motions.

Advantageously, the arrangement for scanning the specimen receiving device is vibrationally decoupled from the laser scanning microscope. The principal consequence of this is to prevent any misalignment of individual optical components of the laser scanning microscope that might be brought about due to vibrations of the rotation device.

Data recording of specimens could be performed unidirectionally in terms of the rapid rotation axis. For example, in the case of an alternating rotation of the specimen receiving device, a data recording could be accomplished only when the specimen receiving device is, for example, rotating clockwise, but not when the specimen receiving device is rotating counter-clockwise.

Data recording could also be accomplished bidirectionally in terms of the rapid rotation axis. Image data are thus recorded during both clockwise and counter-clockwise rotation. No provision is made here for data recording at the locations of the reversing points, i.e. the selected rotation region of the specimen receiving device must be larger than the specimen region that is to be imaged.

The image data recorded with the aid of the rotation device are present, after digitization with a digitization device in the control computer of the laser scanning microscope, in a curvilinear coordinate system. These image data are transformed with a computer program module into a rectilinear coordinate system. If the specimen receiving device is rotated, for data recording, in each case about a first and a second axis, the transformation can be performed according to the equation $$\begin{pmatrix} x \\ y \end{pmatrix} = r_1 \begin{pmatrix} \sin\alpha \\ \cos\alpha - 1 \end{pmatrix} + r_2 \begin{pmatrix} \cos\alpha & \sin\alpha \\ -\sin\alpha & \cos\alpha \end{pmatrix} \begin{pmatrix} \cos\beta - 1 \\ \sin\beta \end{pmatrix}$$

where $\alpha$ and $\beta$ are the angular positions of the respective rotation axes; $r_1$, $r_2$ are the radii of the respective rotation axes; and x, y are the coordinates of an image point after transformation.

In terms of a concrete embodiment, the transformation is performed at least partially with the aid of an input lookup table of the digitization device. For example, the function values of the functions sin $\alpha$ and sin $\beta$ could be stored in the input lookup table.

In addition, the corresponding matrix multiplication of the transformation equation could be performed in a field-programmable gate array (FPGA) module, downstream from the input lookup table, in which the constants $r_1$ and $r_2$ are also stored. This makes possible, in particular, transformation simultaneously with data recording, which in turn allows high data throughput.

If provision is made for the use of immersion oil for microscopic imaging, the oil is advantageously pipetted (preferably automatically), onto the specimen holder before the automatic loading operation. The immersion oil could, for example, be water, glycerol, or conventional immersion oil, but depending on its viscosity an upper limit is then placed on the maximum scanning speed of the specimen receiving device.

In a concrete embodiment, the laser scanning microscope has a stationary illumination and detection beam. As a result, complex field correction of a microscope objective that is used is not necessary, and a relatively simple and economical objective can be used. This procedure is advantageous especially in terms of alignment of the optical components, since the laser scanning microscope needs to be aligned only during production, and requires no further alignment thereafter.

For allocation of the scanned image data to the coordinates of the respective scan position, the rotation device has a position transducer whose output is connected to the control unit of the laser scanning microscope. This position transducer supplies the instantaneous angular positions of the rotation axes necessary for the transformation equation, so that a detected image point can be allocated with high accuracy to its actual position coordinate. If a translational motion is provided for scanning of the specimen receiving device, the device for performing the translational motion analogously has a position transducer whose output is also connected to the control unit of the laser scanning microscope.

BRIEF DESCRIPTION OF THE DRAWINGS

There are various ways of advantageously embodying and developing the teaching of the present invention. Reference is made, for that purpose, on the one hand to the claims which follow claim 1, and on the other hand to the explanation below of exemplary embodiments of the invention with reference to the drawings. In conjunction with the explanation of the preferred exemplary embodiments of the invention with reference to the drawings, a general explanation is also given of preferred embodiments and developments of the teaching. In the drawings:

DETAILED DESCRIPTION OF THE INVENTION

Figure 1:
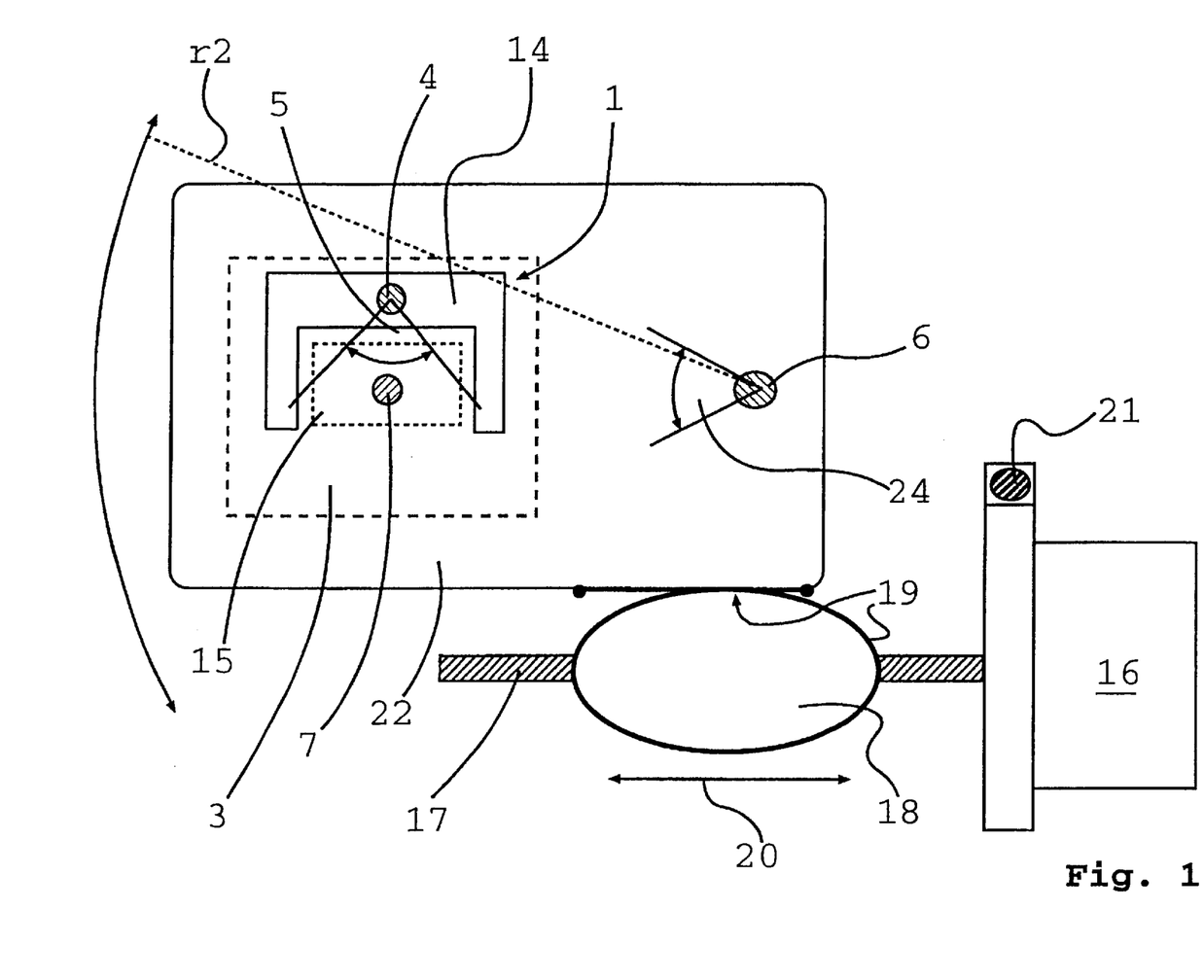
FIG. 1 shows, in a schematic depiction, a first exemplary embodiment of an arrangement according to the present invention for scanning a specimen receiving device.
Figure 2:
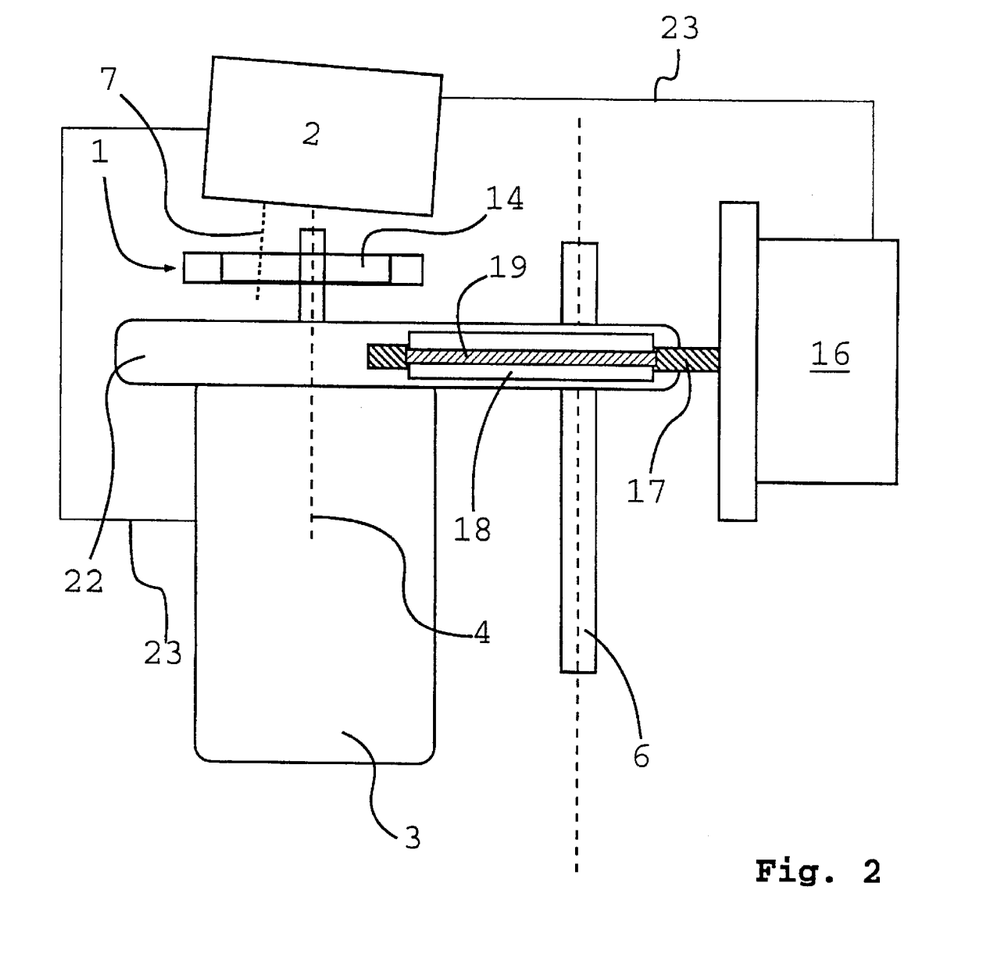
FIG. 2 shows, in a schematic depiction, a side view of the arrangement according to the present invention for scanning a specimen receiving device from FIG. 1.

FIGS. 1 and 2 show a first exemplary embodiment of an arrangement for scanning a specimen receiving device 1. Laser scanning microscope 2 used for data recording is depicted schematically in FIG. 2. Specimen receiving device 1 can be rotated by a rotation device 3 about a first axis 4 in an angular region 5, alternatingly clockwise and counter-clockwise. A galvanometer or a resonant galvanometer is used as the rotation device 3. The galvanometer is operated at a frequency that lies in a range from 10 to 1000 Hz.

Figure 4:
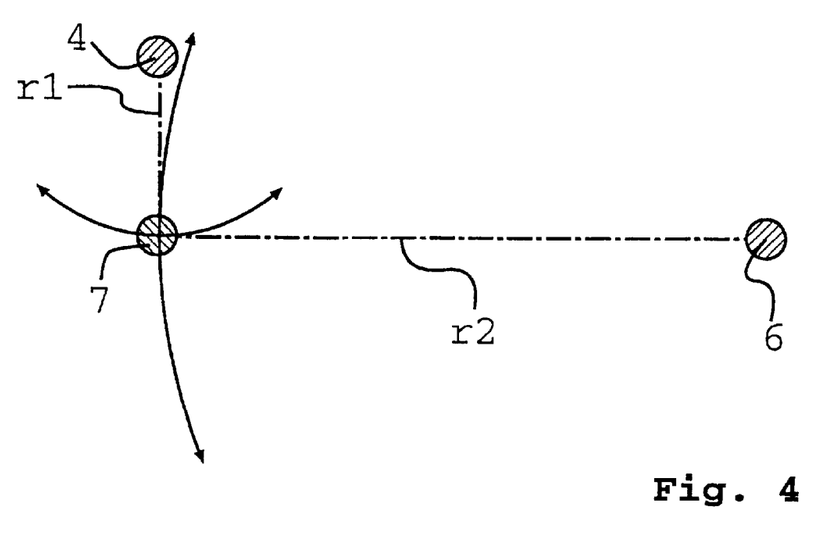
FIG. 4 shows the relative position of two rotation axes of an arrangement for scanning a specimen receiving device.
Figure 5:
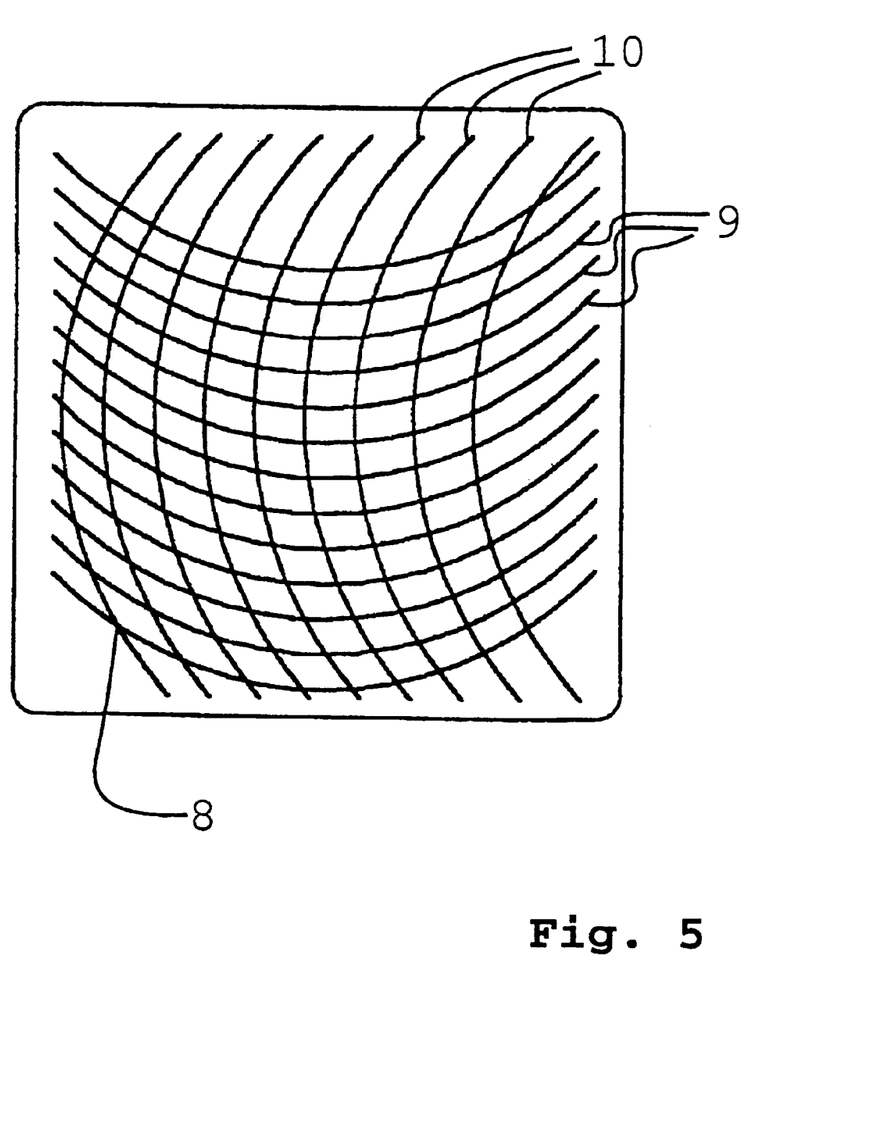
FIG. 5 shows, in a schematic depiction, the scan trajectories and the resulting coordinate system of an arrangement according to the present invention for scanning a specimen receiving device.

Specimen receiving device 1 is rotatable together with rotation device 3 about a second axis 6. First rotation axis 4 is arranged parallel to second rotation axis 6. It is evident from FIG. 4 that the two rotation axes 4, 6 are arranged relative to optical axis 7 of the laser scanning microscope in such a way that the resulting scan trajectories 8 of the two axes extend almost orthogonally to one another at their intersection points. FIG. 5 depicts scan trajectories 8 and the resulting coordinate system. Scan trajectories 9 result from the alternating rotation about first axis 4, and scan trajectories 10 result from the alternating rotation about second axis 6. It is further evident from FIG. 5 that trajectories 10 are almost perpendicular to trajectories 9 at their intersection point. In FIG. 5, radius $r_1$ of first axis 4 (i.e. the distance from first axis 4 to optical axis 7 of laser scanning microscope 2) is selected to be equal to radius $r_2$ of second axis 6. A galvanometer is provided as the rotation device 3 for the second axis 6 as well.

Figure 3:
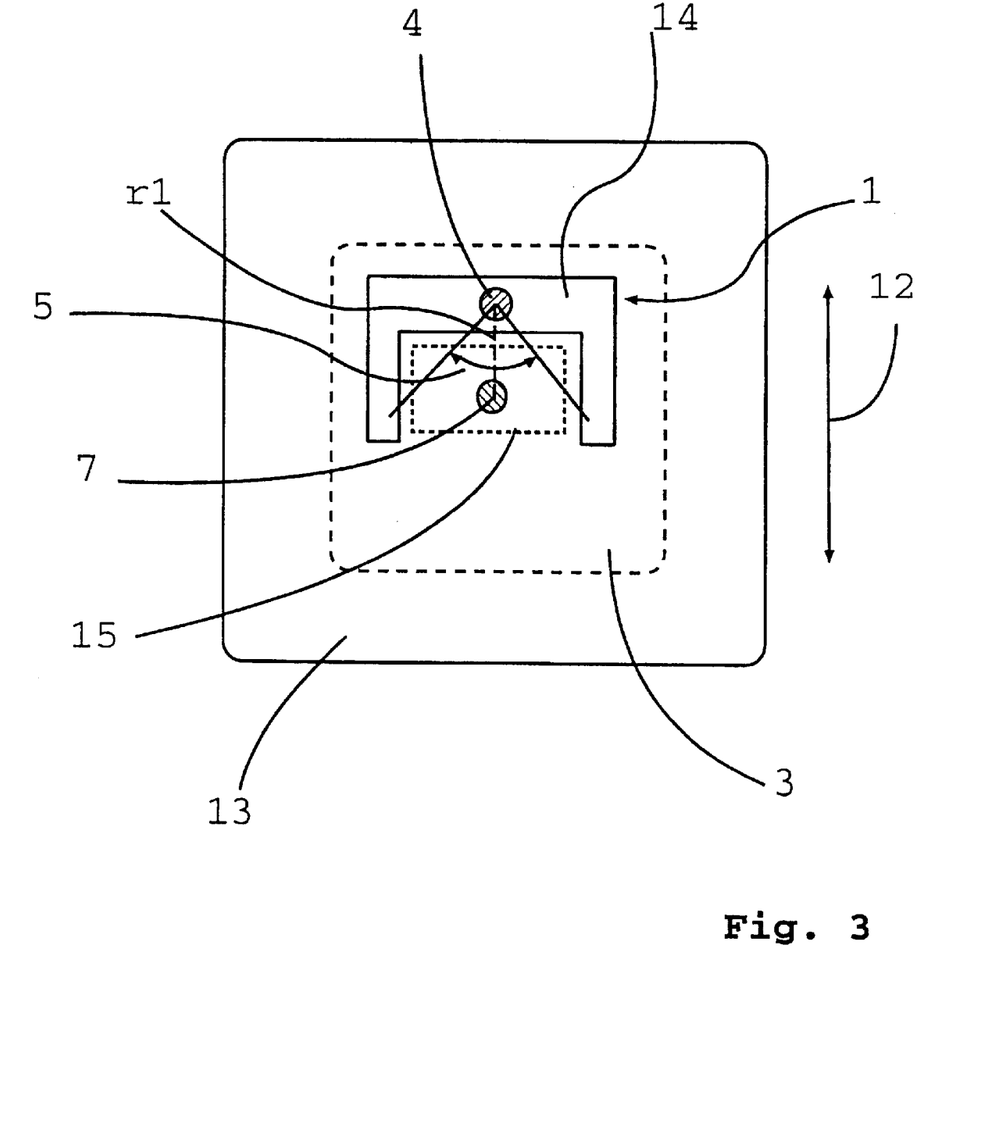
FIG. 3 shows, in a schematic depiction, an alternative exemplary embodiment of an arrangement for scanning a specimen receiving device.
Figure 6:
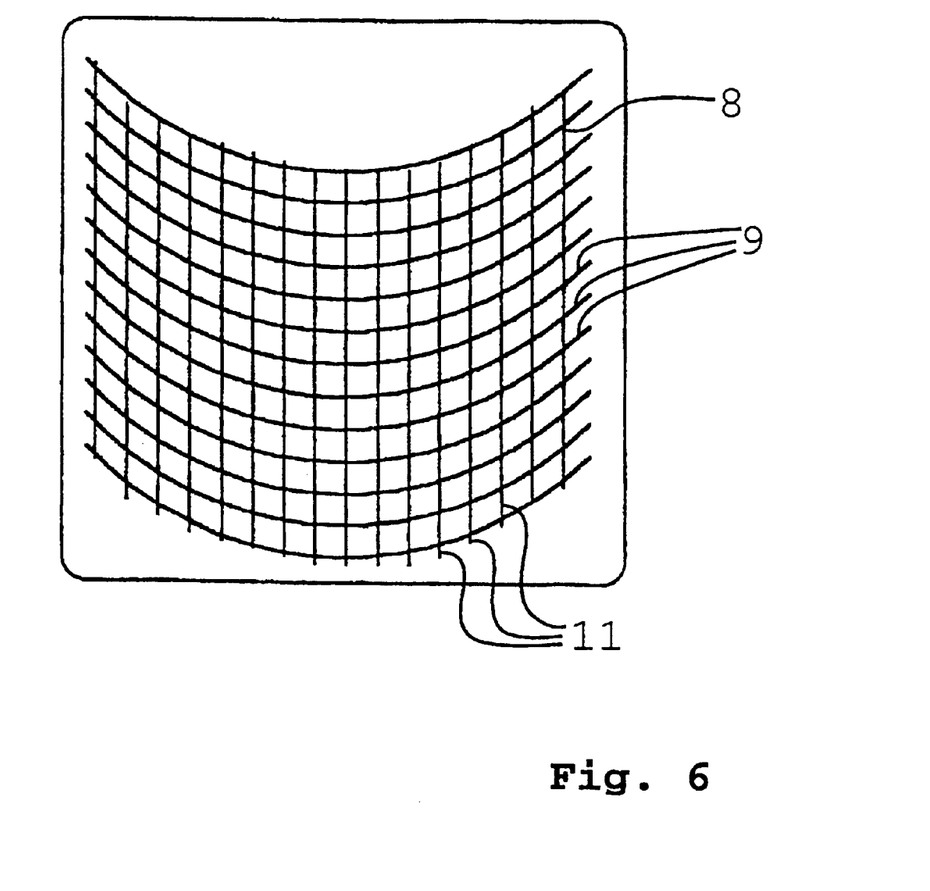
FIG. 6 shows, in a schematic depiction, the scanning trajectories and the resulting coordinate system of an alternative arrangement for scanning a specimen receiving device.

In an alternative embodiment as shown in FIG. 3, specimen receiving device 1 together with rotation device 3 allocated to it are moved translationally. The scanning motion produced thereby yields scan trajectories 8 depicted in FIG. 6, in which scan trajectories 9 result from the alternating rotation of the specimen receiving device about first axis 4, and scan trajectories 11 from the translational motion along direction 12. The translational motion may extend along one linear direction 12. Furthermore the translational motion may extend periodically in opposite directions 12.

In the embodiments shown in FIGS. 1 through 3, the resulting scanning motion of the specimen receiving device extends in one plane that extends parallel to the surface of the specimen receiving device. In the embodiment shown in FIG. 3, the translational motion thus also extends parallel to the surface of the specimen receiving device. This motion periodically extends in opposite directions 12, and is implemented with a linear displacement stage 13 that is depicted only schematically. In this context, the movable portion of linear displacement stage 13 receives rotation device 3, which in turn receives specimen receiving device 1. FIG. 2 indicates that specimen receiving device 1 is arranged with respect to optical axis 7 of laser scanning microscope 2 in such a way that the line normal to the surface of specimen receiving device 1 forms an angle with optical axis 7 of laser scanning microscope 2 that is equal to 5 degrees, and in this Figure is not drawn to scale. The exciting beam of the laser scanning microscope thus strikes the surface of specimen receiving device 1 at an angle of incidence of 5 degrees, approximately 5% of the intensity of the exciting light being thereby reflected from the surface of specimen receiving device 1 at a return angle of 5 degrees. This principal return reflection is thus advantageously reflected out of the detection beam path, so that the fluorescent light to be detected here, whose intensity is approximately three orders of magnitude less than that of the exciting light, can be detected more efficiently as compared to conventionally used illumination methods. The laser scanning microscope 2 has a stationary illumination and detection beam.

FIGS. 1 and 2 indicate merely schematically that specimen receiving device 1 has a specimen holder unit 14 that can automatically be loaded with specimen holders 15. The specimen holder unit 14 is made of material with a low density/weight, preferably of plastic or aluminum. In a preferred embodiment the specimen holder unit 14 is made of aluminum, and is designed so that the center of gravity of specimen receiving device 1 lies on first rotation axis 4. A specimen holder 15 is secured to specimen holder unit 14 with the aid of a negative-pressure device (not depicted), so that no additional retaining devices are arranged on specimen holder unit 14. Furthermore the the specimen holder unit 14 is attached the specimen holder 15 on the basis of magnetic or electromagnetic interaction. It is possible as well to manufacture the specimen holder 15 at least partly of material with a low density/weight, preferably of plastic.

A galvanometer that is operated at a frequency of 100 Hz is used as rotation device 3. For the embodiment depicted in FIGS. 1 and 2, a lever device is used as the rotation device for second axis 6. The lever device has an electric motor 16, a threaded spindle 17, a circulating threaded coupling 18, and a connecting element 19. The shaft of electric motor 16 is embodied as threaded spindle 17, and circulating threaded coupling 18 is positioned in direction 20 by rotation of threaded spindle 17. Electric motor 16 is mounted in pivotably resilient fashion about an axis 21, so that any slight imbalance in threaded spindle 17 is not transferred to rotation device 3 in the form of undesirable additional motion components. Circulating threaded coupling e 18 is connected to rotation device 3 via a connecting element 19. Connecting element 19 is embodied as a leaf spring that surrounds circulating threaded coupling 18 and is attached at its two ends to rotary element 22. The leaf spring has slit-shaped openings through which threaded spindle 17 can pass. In the region between connecting element 19 and rotary element 22, the portion of the leaf spring of the one attachment end also has a slit-shaped opening through which the narrowly configured portion of the leaf spring of the other attachment end can pass. This makes possible almost zero-play transfer of the linear motion of circulating threaded coupling 18 to rotary device 3. Additionally a vibrational decoupling from the laser scanning microscope 2 is provided.

Data recording is accomplished bidirectionally with respect to first axis 4; the measured image data, present in the curvilinear coordinate system, are converted in accordance with a corresponding transformation equation into a rectilinear coordinate system. The transformation equation is obtained from the arrangement of rotation axes 4, 6 or of rotation axis 4 and the translational motion. For the embodiment as shown in FIGS. 1 and 2, the scan geometry of which is evident from FIG. 4, the transformation from the curvilinear coordinate system into the rectilinear coordinate system is performed according to the equation:

$$\begin{pmatrix} x \\ y \end{pmatrix} = r_1 \begin{pmatrix} \sin\alpha \\ \cos\alpha - 1 \end{pmatrix} + r_2 \begin{pmatrix} \cos\alpha & \sin\alpha \\ -\sin\alpha & \cos\alpha \end{pmatrix} \begin{pmatrix} \cos\beta - 1 \\ \sin\beta \end{pmatrix}$$

in which $\alpha$ and $\beta$ are the instantaneous angular positions of the specimen receiving device, and ax parameterizes the alternating rotary motion of first axis 4 and a the alternating rotation of second axis 6. $r_1$ and $r_2$ are the radii of the respective rotation axes, and x, y are the coordinates of the image point in the rectilinear coordinate system after transformation.

This transformation is advantageously performed simultaneously, during data recording, with the aid of an input lookup table. The function values of the functions sin α, sin β, cos α, cos(α−1), and cos(β−1) for all angular positions α, β that the specimen receiving device can occupy during the scanning operation are stored in the input lookup table. The matrix multiplication operation defined by the transformation equation is performed in a field-programmable gate array (FPGA) module, downstream from the input lookup table, in which the constants $r_1$ and $r_2$ are also stored.

In the embodiments shown in FIGS. 1 and 3, the laser scanning microscope has a stationary illumination and detection beam. As a result, the microscope optics (in particular the microscope objective) can be selected specifically for a particular application, thus reducing total system costs. In case immersion oil is used, it is pipetted, preferably automatically, onto the specimen holder before the automatic loading operation is performed.

In the embodiments of FIGS. 1 and 2, rotation device 3 and electric motor 16 each have a position transducer whose output is connected to the control unit of laser scanning microscope 2 via line 23. These position transducers report to the control unit of laser scanning microscope 2 the instantaneous actual angular position of the specimen receiving device (i.e. angles α and β) so that with the aid of the input lookup table, digitization of the measured image data can be performed together with the simultaneous transformation into a rectilinear coordinate system. The procedure is analogous in the embodiment shown in FIG. 3: here the position transducers of rotation device 3 and of linear displacement stage 13 are connected to the control unit of laser scanning microscope 2.

In conclusion, be it noted very particularly that the exemplary embodiments set forth above serve merely to describe the teaching claimed, but do not limit it to the exemplary embodiments selected in purely arbitrary fashion.

PARTS LIST

1 Specimen receiving device
2 Laser scanning microscope
3 Rotation device
4 First axis
5 Angular range of (1)
6 Second axis
7 Optical axis of (2)
8 Scan trajectories
9 Scan trajectories of axis (4)
10 Scan trajectories of axis (6)
11 Scan trajectories of translational motion
12 Direction of translational motion
13 Linear displacement stage
14 Specimen holder unit
15 Specimen holder
16 Electric motor
17 Threaded spindle
18 Recirculating threaded piece
19 Connecting element
20 Positioning device of (18)
21 Shaft of (16)
22 Rotary element
23 Connection between position transducer and (2)
24 Angular range of (22)
r1 Radius of (4)
r2 Radius of (6)

What is claimed is:

1. An arrangement for scanning a specimen comprising:
   a specimen receiving device (1) for data recording
   a laser scanning microscope,
   a rotation device (3), defining a first axis (4), for alternatingly rotating the specimen receiving device (1) about the first axis and
   a second axis (6) is defined in the rotation device (3) for rotating the specimen receiving device (1) about the second axis (6).

2. The arrangement as defined in claim 1, characterized in that the first rotation axis (4) is arranged at least almost parallel to the second rotation axis (6).

3. The arrangement as defined in claim 1, characterized in that an optical axis is defined by the laser scanning microscope (2) and the first and second axes (4, 6) are arranged relative to the optical axis (7) and scan trajectories (8) are defined by the movement around the first and the second axes (4, 6) wherein the scan trajectories (8) of the first and second axes (4, 6) extend almost orthogonally to one another.

4. The arrangement as defined in claim 1, characterized in that the specimen receiving device (1) is translationally movable with the rotation device (3) and the resulting scanning motion of the specimen receiving device (1) lies in one plane.

5. The arrangement as defined in claim 4, characterized in that the resulting scanning motion of the specimen receiving device (1) extends at least almost parallel to the surface of the specimen receiving device (1).

6. The arrangement as defined in claim 5, characterized in that a translational movement is defined, which extends at least almost parallel to a surface defined by the specimen receiving device (1).

7. The arrangement as defined in claim 6, characterized in that the translational motion extends along the optical axis (7).

8. The arrangement as defined in claim 6, characterized in that a linear displacement stage (13) is provided and the translational motion is implemented by way of the linear displacement stage (13) having corresponding guidance means.

9. The arrangement as defined in claim 8, characterized in that the specimen receiving device (1) is arranged with respect to the optical axis (7) of the laser scanning microscope (2) in such a way that the line normal to the surface of the specimen receiving device (1) forms an angle with the optical axis (7) of the laser scanning microscope (2) that differs from 0 degrees.

10. The arrangement as defined in claim 9, characterized in that the angle between the line normal to the surface of the specimen receiving device (1) and the optical axis (7) of the laser scanning microscope (2) is achieved by way of a tilted arrangement of at least one rotation axis (4) relative to the optical axis.

11. The arrangement as defined in claim 9, characterized in that the angle is greater than 0 and less than 10 degrees.

12. The arrangement as defined in claim 1, characterized in that the specimen receiving device (1) has a specimen holder (15) and a specimen holder unit (14).

13. The arrangement as defined in claim 12, characterized in that the specimen receiving device (1) can be automatically loaded with specimen holders (15).

14. The arrangement as defined in claim 1, characterized in that the center of gravity of the specimen receiving device (1) lies on the first or second rotation axis (4, 6).

15. The arrangement as defined in claim 1, characterized in that a lever device is provided as the rotation device for the second axis (6).

16. The arrangement as defined in claim 15, characterized in that the lever device comprises an electric motor (16), a threaded spindle (17), a circulating threaded coupling (18), and a connecting element (19).

17. The arrangement as defined in claim 16, characterized in that the threaded spindle (17) is associated with the shaft of the electric motor (16); and that the circulating threaded coupling (18) can be positioned, by rotation of the threaded spindle (17), in the direction of the axis of the threaded spindle (17).

18. The arrangement as defined in claim 16, characterized in that the connecting element (19) connects the circulating threaded coupling (18) and the rotation device (3) and is embodied as a leaf spring.

19. The arrangement as defined in one of claim 16, characterized in that the electric motor (16) is mounted in resiliently pivotable fashion about an axis (21).

20. The arrangement as defined in claim 1, characterized in that data recording of specimens is performed unidirectionally in terms of the rapid rotation axis.

21. The arrangement as defined in claim 1, characterized in that data recording is accomplished bidirectionally in terms of the rapid rotation axis.

22. The arrangement as defined in claim 1, characterized in that the measured image data, present in the curvilinear coordinate system, are transformed into a rectilinear coordinate system.

23. The arrangement as defined in claim 22, characterized in that the transformation is performed according to the equation $$\begin{pmatrix} x \\ y \end{pmatrix} = r_1 \begin{pmatrix} \sin\alpha \\ \cos\alpha - 1 \end{pmatrix} + r_2 \begin{pmatrix} \cos\alpha & \sin\alpha \\ -\sin\alpha & \cos\alpha \end{pmatrix} \begin{pmatrix} \cos\beta - 1 \\ \sin\beta \end{pmatrix}$$

where $\alpha$ and $\beta$ are the angular positions of the respective rotation axes; $r_1$, $r_2$ are the radii of the respective rotation axes; and x, y are the coordinates of an image point after transformation.

24. The arrangement as defined in claim 23, characterized in that the transformation is performed at least partially with the aid of an input lookup table.

25. The arrangement as defined in claim 1, characterized in that the rotation device (3) has a position transducer whose output is connected to a control unit of the laser scanning microscope (2).

26. The arrangement as defined in claim 25, characterized in that the device for performing the translational motion has a position transducer whose output is connected to the control unit of the laser scanning microscope (2).

27. The arrangement as defined in claim 1, characterized in that the laser scanning microscope (2) is a confocal laser scanning microscope.

* * * * *